United States Patent
Jang et al.

(10) Patent No.: US 9,778,774 B2
(45) Date of Patent: Oct. 3, 2017

(54) MOBILE TERMINAL

(71) Applicant: LG ELECTRONICS INC., Seoul (KR)

(72) Inventors: Sungkwon Jang, Seoul (KR); Kuangjun An, Seoul (KR); Junghoon Hwang, Seoul (KR); Taeho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/923,117

(22) Filed: Oct. 26, 2015

(65) Prior Publication Data

US 2016/0048254 A1 Feb. 18, 2016

Related U.S. Application Data

(63) Continuation of application No. 14/157,160, filed on Jan. 16, 2014, now Pat. No. 9,189,016.

(30) Foreign Application Priority Data

Aug. 12, 2013 (KR) .......................... 10-2013-0095589

(51) Int. Cl.
*H05K 7/00* (2006.01)
*H04M 1/02* (2006.01)
(Continued)

(52) U.S. Cl.
CPC .......... *G06F 3/0412* (2013.01); *G06F 1/1601* (2013.01); *G06F 1/1626* (2013.01);
(Continued)

(58) Field of Classification Search
CPC .................................................. H04M 1/0202
(Continued)

(56) References Cited

U.S. PATENT DOCUMENTS

| | | | | |
|---|---|---|---|---|
| 2006/0285302 | A1* | 12/2006 | Kim | H05K 1/028 361/749 |
| 2008/0223708 | A1* | 9/2008 | Joo | H04M 1/0202 200/600 |

(Continued)

FOREIGN PATENT DOCUMENTS

| | | |
|---|---|---|
| CN | 101616214 A | 12/2009 |
| DE | 10 2012 211 232 A1 | 1/2013 |

*Primary Examiner* — Jerry Wu
(74) *Attorney, Agent, or Firm* — Birch, Stewart, Kolasch & Birch, LLP

(57) ABSTRACT

A mobile terminal including a body having a front surface, a roar surface and side surfaces; a window disposed on the front surface, and having its edge portion bent so as to form at least part of the side surfaces; a frame configured to support the window; a display disposed to face the window, and configured to output visual information and formed such that its edge portion is bent in correspondence to a bent shape of the window; and a touch sensor disposed between the window and the display, configured to sense a touch input applied to the window. Also, the touch sensor includes a folded part. Furthermore, the touch sensor comprises a curved portion curved by the folded part of the touch sensor. In addition, the curved portion is spaced from an end part of the display in a thickness direction of the body so as to form a space between the end part of the display and the curved portion. Lastly, an accommodation groove is recessed from the frame in the thickness direction of the body and is configured to accommodate therein at least part of the curved portion of the touch sensor.

9 Claims, 8 Drawing Sheets

(51) Int. Cl.
*G06F 3/041* (2006.01)
*G06F 1/16* (2006.01)

(52) U.S. Cl.
CPC .......... *G06F 1/1637* (2013.01); *G06F 1/1652* (2013.01); *H04M 1/0266* (2013.01); *G06F 2203/04102* (2013.01); *G06F 2203/04103* (2013.01); *H04M 2250/22* (2013.01)

(58) Field of Classification Search
USPC ........................................ 361/679.01–679.03
See application file for complete search history.

(56) References Cited

U.S. PATENT DOCUMENTS

| | | | |
|---|---|---|---|
| 2008/0227507 A1* | 9/2008 | Joo | H04M 1/0266 455/575.8 |
| 2011/0007042 A1 | 1/2011 | Miyaguchi | |
| 2013/0063891 A1 | 3/2013 | Martisauskas | |
| 2013/0076612 A1 | 3/2013 | Myers | |
| 2013/0271896 A1* | 10/2013 | Hu | G02F 1/133308 361/679.01 |

* cited by examiner

MOBILE TERMINAL

CROSS-REFERENCE TO RELATED APPLICATIONS

This application is a continuation of co-pending U.S. patent application Ser. No. 14/157,160 filed on Jan. 16, 2014, which claims priority to Korean Application No. 10-2013-0095589, filed on Aug. 12, 2013, the entire contents of all of the above applications are hereby incorporated by reference.

BACKGROUND OF THE DISCLOSURE

Field of the Invention

The present disclosure relates to a mobile terminal, and particularly, to a mobile terminal having a display and a touch sensor.

Discussion of the Related Art

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Various attempts have been made to implement complicated functions in such a multimedia device by means of hardware or software. As one example, a user interface for allowing a user to easily and conveniently search for or select a function is being provided.

As the mobile terminal is regarded as a personal belonging to express a user's personality, various designs are required. The designs include structural changes and improvements for allowing a user to more conveniently use the mobile terminal. As one of such structural changes and improvements, a structure, where a side touch as well as a front touch is implemented and the mobile terminal is easily fabricated, may be considered.

SUMMARY OF THE INVENTION

Therefore, an aspect of the detailed description is to provide a mobile terminal having a new type of structure for a front touch and a side touch.

Another aspect of the detailed description is to provide a mobile terminal capable of implementing side touch, and capable of minimizing a size of a bezel portion.

To achieve these and other advantages and in accordance with the purpose of this specification, as embodied and broadly described herein, there is provided a mobile terminal, comprising: a body having a front surface, a rear surface and side surfaces; a window disposed on the front surface, and having its edge portion bent so as to form at least part of the side surfaces; a display disposed to face the window, and configured to output visual information; and a touch sensor disposed between the window and the display, configured to sense a touch input applied to the window, and covering a rear surface of the display as at least part thereof is folded.

In an embodiment of the present invention, the window may comprise a front portion which forms at least part of the front surface; and an inclined portion which extends from an edge portion of the front portion in a direction inclined from the front portion. The touch sensor may comprise a first part corresponding to the front portion, a second part corresponding to the inclined portion partially or wholly, and a third part folded partially or wholly so as to be overlapped with the second part. Touch sensing patterns may be formed at the first part and the second part. And signal transmission patterns, connected to the touch sensing patterns and configured to transmit touch signals to a circuit board, may be formed at the third part. A flexible printed circuit board (FPCB) connected to the circuit board may be mounted to the third part. A plurality of cut-out portions may be formed at the third part.

In an embodiment of the present invention, the touch sensor may comprise a curved portion curved by the folding between the second part and the third part. The body may comprise a frame which supports the window. An accommodation groove, configured to accommodate therein at least part of the curved portion, may be formed at the frame.

In an embodiment of the present invention, an edge portion of the display may be disposed between the second part and the third part. The third part may be bonded to the rear surface of the display.

In an embodiment of the present invention, the window may comprise a vertical side portion which extends from the inclined portion in a thickness direction of the body. The second part of the touch sensor may be bent from at least one point so as to cover both of the inclined portion and the vertical side portion. The third part of the touch sensor may be formed to have a shape corresponding to that of the second part, so as to maintain a gap from the second part.

In an embodiment of the present invention, the display may be formed such that its edge portion is bent in correspondence to a bent shape of the window. The touch sensor may comprise a curved portion curved by the folding. The curved portion may be spaced from an end part of the display in a thickness direction of the body. A space may be formed between the end of the display and the curved portion. A metallic member may be disposed at the space.

According to another aspect of the present invention, there is provided a mobile terminal, comprising: a window formed of a transmissive material; a display having a side end part spaced from a side end part of the window, disposed to face the window, and configured to output visual information; and a touch sensor disposed between the window and the display, configured to sense a touch input applied to the window, and covering a rear surface of the display with enclosing an end part of the display.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 3B is a rear perspective view of the mobile terminal of FIG. 3a;

FIG. 4 is a sectional view taken along line 'A-A' in FIG. 3a;

FIG. 6 is an exploded view of the mobile terminal of FIG. 3a;

DETAILED DESCRIPTION OF THE INVENTION

Hereinafter, a mobile terminal of the present invention will be explained in more detail with reference to the attached drawings. The suffixes attached to components of the mobile terminal, such as 'module' and 'unit or portion' were used for facilitation of the detailed description of the present invention. Therefore, the suffixes do not have different meanings from each other.

The mobile terminal according to the present invention may include a smart phone, a laptop computer, a digital broadcasting terminal, a Personal Digital Assistant (PDA), Portable Multimedia Player (PMP), a navigation system, etc.

Figure 1:
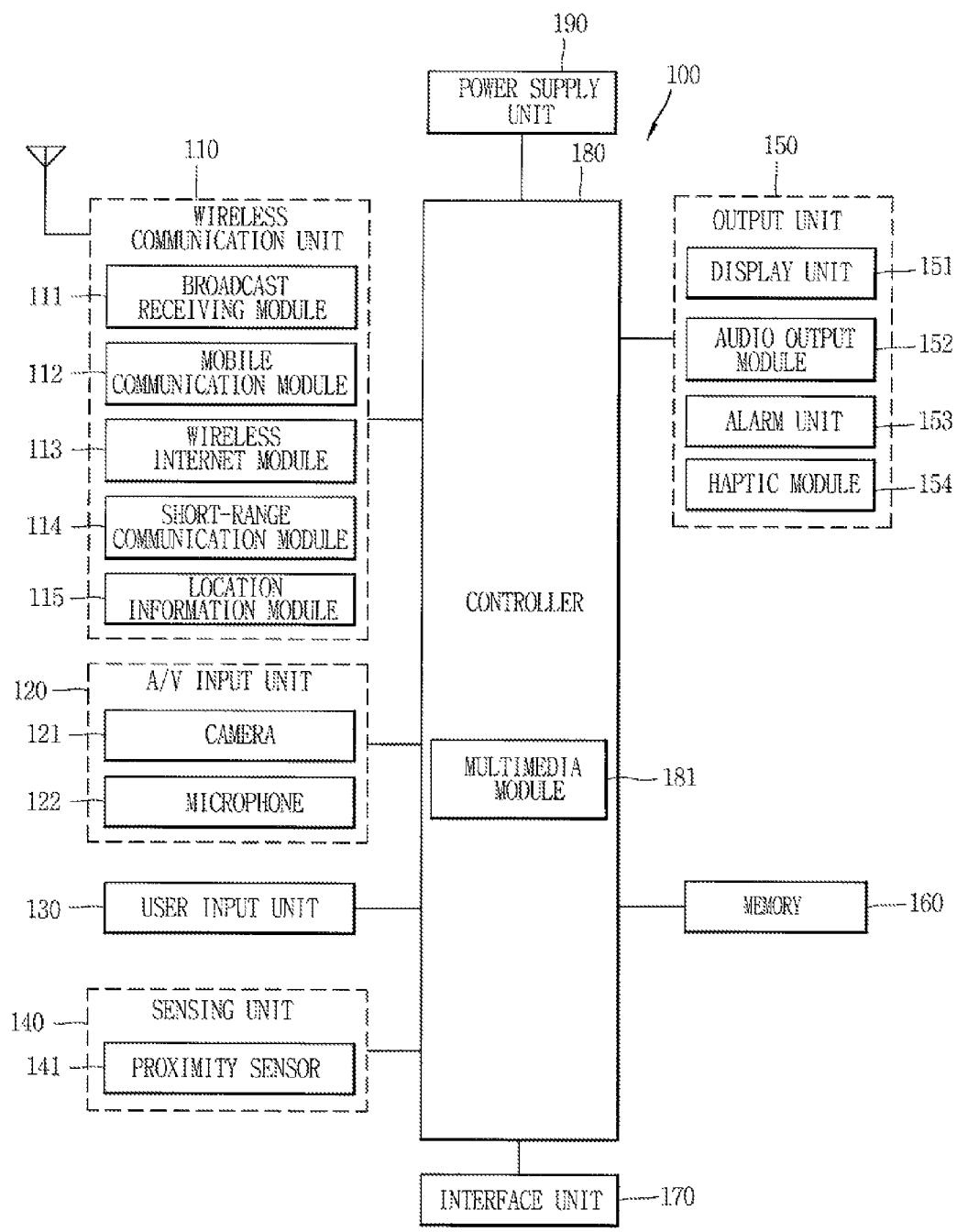
FIG. 1 is a block diagram of a mobile terminal according to an embodiment of the present invention.

FIG. 1 is a block diagram of a mobile terminal according to an embodiment of the present invention.

As shown in FIG. 1, the mobile terminal 100 includes a radio communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The radio communication unit 110 typically includes one or more components to authorize radio communication between the mobile terminal 100 and a radio communication unit system or a network in which the mobile terminal 100 is located. For example, the radio communication unit 110 may include a broadcast receiving module 111, a mobile communication module 112, a wireless Internet module 113, a short range communication module 114, a location information module 115, etc.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may mean a server for generating broadcast signals and/or broadcast-related information and transmitting them to the mobile terminal, or a server for receiving generated broadcast signals and/or broadcast-related information and transmitting them to the mobile terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 115 denotes a module for sensing or calculating a position of a mobile terminal. An example of the position information module 115 may include a Global Position System (GPS) module.

Referring to FIG. 1, the A/V input unit 120 is configured to receive an audio or video signal. The A/V input unit 120 may include a camera 121, a microphone 122 or the like. The camera 121 processes image data of still pictures or video acquired by an image capture device in a video capturing mode or an image capturing mode. The processed image frames may be displayed on a display module 151.

The image frames processed by the camera 121 may be stored in the memory 160 or transmitted via the wireless communication unit 110. The camera 121 may be provided in two or more according to the configuration of the mobile terminal.

The microphone 122 may receive sounds (audible data) via a microphone in a phone call mode, a recording mode, a voice recognition mode, and the like, and can process such sounds into audio data. The processed audio voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is open or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner. The output unit 150 may include the display module 151, an audio output module 152, an alarm unit 153, a haptic module 154, and the like.

The display module 151 may display information processed in the mobile terminal 100. For example, when the mobile terminal 100 is in a phone call mode, the display module 151 may display a User Interface (UI) or a Graphic User Interface (GUI) associated with a call or other communication (such as text messaging, multimedia file downloading, etc.). When the mobile terminal 100 is in a video call mode or image capturing mode, the display module 151 may display a captured image and/or received image, a UI or GUI that shows videos or images and functions related thereto, and the like.

The display module 151 may include at least one of a liquid Crystal Display (LCD), a Thin Film Transistor-LCD (TFT-LCD), an Organic Light Emitting Diode (OLED) display, a flexible display, a three-dimensional (3D) display, or the like.

Some of these displays may be configured to be transparent so that outside may be seen therethrough, which may be referred to as a transparent display. A representative example of the transparent display may include a Transparent Organic Light Emitting Diode (TOLED), and the like. The rear portion of the display module 151 may also be implemented to be optically transparent. Under this configuration, a user can view an object positioned at a rear side of a body through a region occupied by the display module 151 of the body.

The display module 151 may be implemented in two or more in number according to a configured aspect of the mobile terminal 100. For instance, a plurality of displays may be arranged on one surface integrally or separately, or may be arranged on different surfaces.

Here, if the display module 151 and a touch sensitive sensor (referred to as a touch sensor) have a layered structure therebetween, the structure may be referred to as a touch screen. The display module 151 may be used as an input device rather than an output device. The touch sensor may be implemented as a touch film, a touch sheet, a touch pad, and the like.

The touch sensor may be configured to convert changes of a pressure applied to a prescribed part of the display module 151; or a capacitance occurring from a prescribed part of the display module 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display module 151 has been touched.

Referring to FIG. 1, a proximity sensor 141 may be arranged at an inner region of the mobile terminal blocked by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, and so on.

The alarm unit 153 may provide outputs to inform about the occurrence of an event of the mobile terminal 100. Typical events may include call reception, message reception, key signal inputs, a touch input, etc. in addition to audio or video outputs, the alarm unit 153 may provide outputs in a different manner to inform about the occurrence of an event. The video signal or the audio signal may be output via the display module 151 or the audio output module 152. Accordingly, the display module 151 or the audio output module 152 may be classified as part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a uses muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs). Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
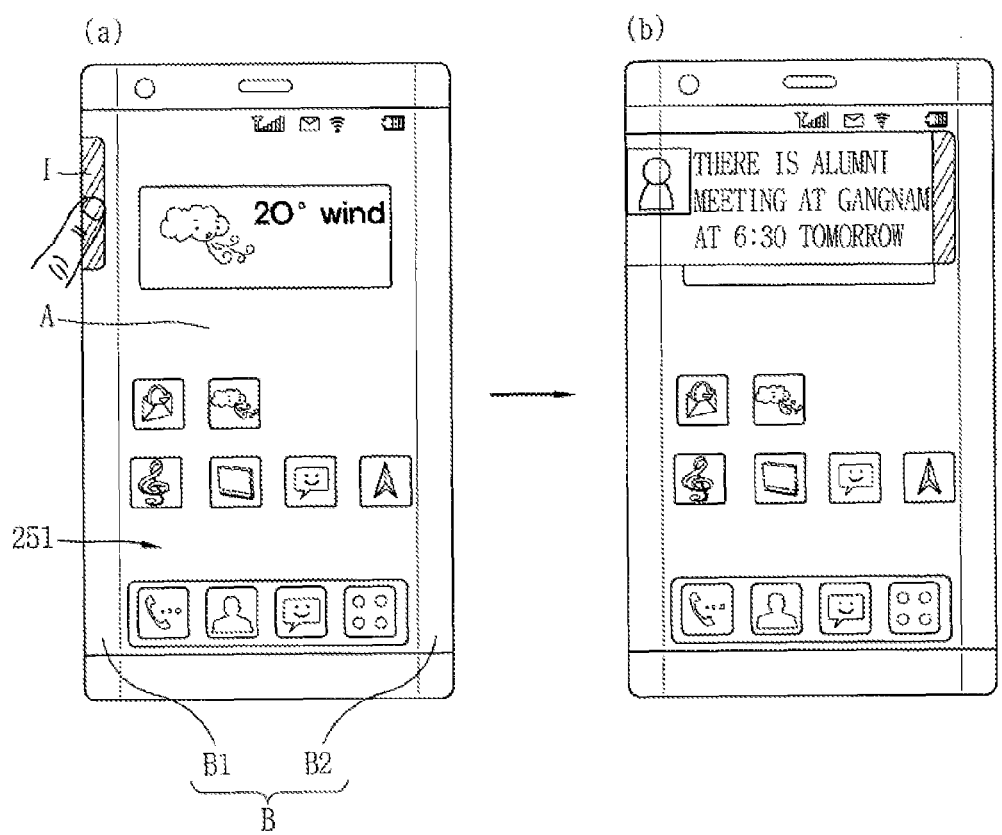
FIG. 2 is a conceptual view illustrating an operation of a mobile terminal according to the present invention.

FIG. 2 is a conceptual view illustrating an operation implemented by the mobile terminal of the present invention.

Referring to FIG. 2, a display module 251 is provided with a first region (A) arranged on the front surface of the body, and a second region (B) extending from the first region (A) and arranged on the side surfaces of the body (wherein, a surface of the mobile terminal viewed from the side is defined as a side surface).

The first region (A) and the second region (B) display different types of information, and are provided with different types of user graphic interfaces (GUI).

The second region (B) is provided with a left region (131) disposed on a left side surface of the mobile terminal, and a right region (132) disposed on a right side surface of the mobile terminal. Under such configuration, the second region (B) has a symmetric structure in right and left directions based on the first region (A).

Referring to FIG. 2 (*a*), a home screen page may be output to the display module 251 of the mobile terminal. The home screen page may include at least one object. The Object may be an icon or a widget of an application installed at the mobile terminal. The home screen page may be output to an entire region of the display module 251 including the first region (A) and the second region (B). However, the present invention is not limited to this. For instance, the home screen page may be output only to the first region (A), and a touch input may be applied to the second region where information is not output.

Referring to FIG. 2 (*b*), once a touch input is applied to the second region (B), the controller senses the touch input and performs a control operation related to the touch input, in this embodiment, if a touch input is applied to a notification icon (I) informing occurrence of an event, information on the event is displayed on the first region (A).

Such operation to touch the side surfaces requires a hardware configuration. Hereinafter, the hardware configuration of the mobile terminal which performs the operation of FIG. 2 will be explained in more detail. The present invention also provides a structure to perform the operation by hardware, and to implement a large screen with a thin bezel portion.

Figure 3A:
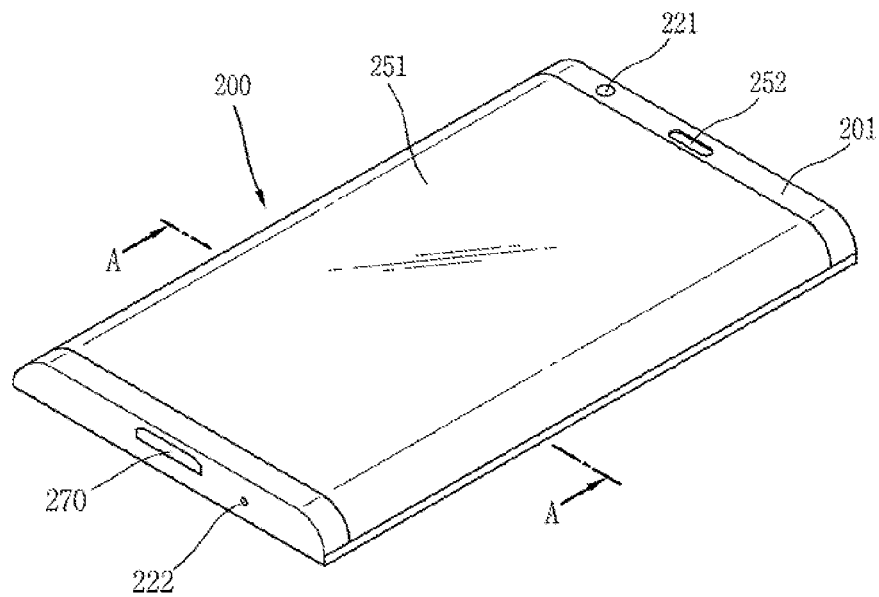
FIG. 3A is a front perspective view of a mobile terminal according to the present invention.
Figure 3B:
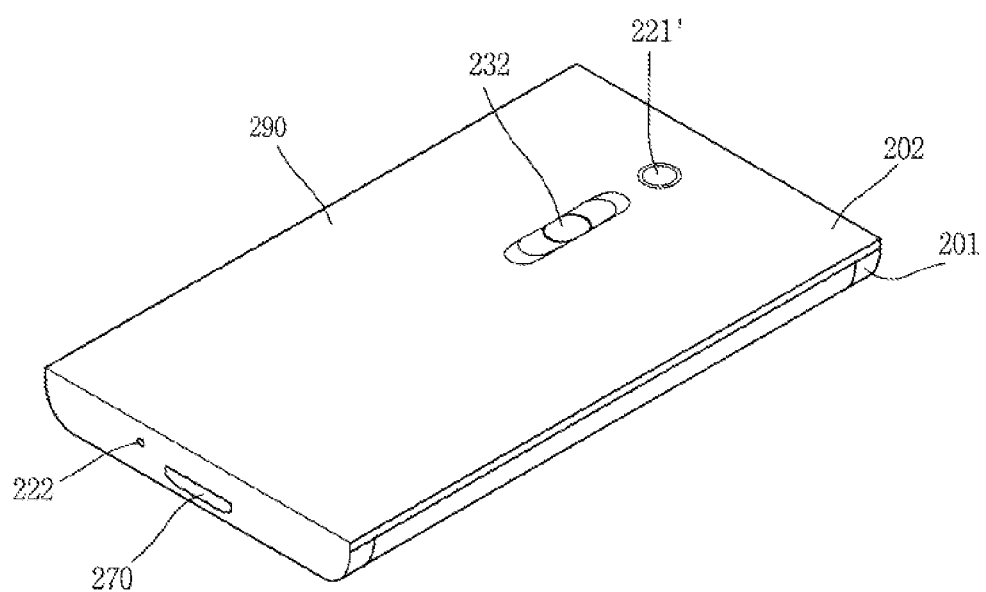

FIG. 3*a* is a front perspective view of a mobile terminal according to the present invention, and FIG. 3*b* is a rear perspective view of the mobile terminal of FIG. 3*a*.

The mobile terminal 200 according to the present invention is a bar type mobile terminal. However, the present invention is not limited to this, but may be applied to a slide type in which two or more bodies are coupled to each other so as to perform a relative motion, a folder type, or a swing type, a swivel type and the like.

A body of the mobile terminal 200 comprises a case (casing, housing, cover, etc.). In this embodiment, the case may be divided into a front case 201 and a rear case 202 (refer to FIGS. 3*a* and 3*b*) A space formed by the front case 201 and the rear case 202 may accommodate various components therein. At least one intermediate case may further be disposed between the front case 201 and the rear case 202.

Such cases may be formed by injection-molded synthetic resin, or may be formed using a metallic material such as stainless steel (STS) or titanium (Ti).

The display module 251, an audio output module 252, a camera module 221, etc. may be disposed at the front body, mainly at the front case 201. An interface 270, etc. may be disposed on side surfaces of the front case 201 and the rear case 202.

The display module 251 occupies most of a main surface of the front case 201. That is, the display module 251 is disposed on the front surface of the mobile terminal, and is configured to display visual information. In the present invention, the display module 251 is formed on the side surfaces as well as on the front surface. More specifically, the display module 251 is provided with a first region (A) arranged on the front surface of the body, and a second region (B) (refer to FIG. 2) extending from the first region (A) and arranged on the side surfaces of the body.

For instance, a window arranged on an upper surface of the display module 251 has its two side suffices bent. Under such configuration, the appearance of the front surface and the side surfaces of the body is determined by the window. Therefore, the first region (A) and the second region (B) may be connected to each other without a boundary therebetween. In this case, the display module 251 may be provided with a display bent and mounted in the mobile terminal in correspondence to the window.

As another example, the display module 251 may be a flexible display. The flexible display includes a display bent, twisted, folded and rolled up by an external three. The flexible display may include a general flexible display and electronic paper.

The general flexible display indicate a light-weighted and unbreakable display fabricated on a thin and flexible substrate which can be bent or folded like paper, while maintaining characteristics of the conventional flat display.

Electronic paper is a display technique using characteristics of general ink, which may be different from a general flat display in that reflected light is used. The electronic paper may change images or texts by twisting balls, or an electrophoresis using capsules.

The body, where two side surfaces of the display module are bent, can be implemented by the flexible characteristics.

The audio output unit 252 and the camera module 221 may be disposed at a region adjacent to one end of the display module 251, and a front user input unit (not shown) and a microphone 222 may be disposed at a region adjacent to another end of the display module 251.

The front user input unit, an example of the user input unit 130 (refer to FIG. 1) may include a plurality of manipulation units. The manipulation units may be referred to as manipulating portions, and may include any type of ones that can be manipulated in a user's tactile manner.

The display module 251 may form a touch screen together with a touch sensor. In this case, the touch screen may be implemented as a user input unit. Under such configuration, a front user input unit may not be provided on the front surface of the mobile terminal. That is, the first region (A) may be the only user input unit positioned on the front surface of the mobile terminal.

Referring to FIG. 3*b*, a camera module 221' may be additionally provided on the rear case 202. The camera module 221' faces a direction which is opposite to a direction faced by the camera module 221 (refer to FIG. 3*a*), and may have different pixels from those of the camera module 221.

For example, the camera module 221 may operate with relatively lower pixels (lower resolution). Thus, the camera module 221 may be useful when a user can capture his face and send it to another party during a video call or the like. On the other hand, the camera module 221' may operate with a relatively higher pixels (higher resolution) such that it can be useful for a user to obtain higher quality pictures for later use. The camera modules 221 and 221 may be installed at the body so as to rotate or pop-up.

A flash and a mirror may be additionally disposed close to the camera module 221'. The flash operates in conjunction with the camera module 221' when taking a picture using the camera module 221'. The mirror can cooperate with the camera module 221' to allow a user to photograph himself in a self-portrait mode.

An audio output unit (not shown) may be additionally arranged on a rear surface of the body. The audio output unit disposed on the rear surface of the body may implement a stereo function, together with the audio output unit 252 (refer to FIG. 3*a*) disposed on the front surface of the body. And the audio output unit disposed on the rear surface of the body may be configured to operate as a speakerphone during a call.

That is, a first audio output unit 252 configured as a receiver may be formed on the front surface, and a second audio output unit configured as a speaker may be formed on the rear surface. However, the present invention is not limited to this. That is, the second audio output unit may be provided on a side surface of the mobile terminal.

A power supply unit 290 for supplying power to the mobile terminal 200 is mounted to the body. The power supply unit 290 may be mounted in the body, or may be detachably mounted to the body.

A rear user input unit 232 may be disposed on the rear surface of the body. The rear user input unit 232 may be disposed below the camera module 221'.

The rear user input unit 232 is manipulated to input various commands for controlling the operation of the mobile terminal 200. For instance, the rear user input unit 232 is configured to input commands such as POWER ON/OFF, START, END and SCROLL, commands for controlling a level of sound outputted from the audio output module 252, or commands for converting the current mode of the display module 251 to a touch recognition mode. However, the present invention is not limited to this. That is, the mobile terminal may be provided with only one of the front user input unit and the rear user input unit 232.

Referring to FIG. 3a back, at least part of the second region (B) forms a side input unit. The side input unit may be provided with a touch sensor, and may be selectively combined with the display module 251. For instance, the side input unit may be a touch screen together with the display module 251, or may be a touch sensing region rather than the display module 251.

Figure 4:
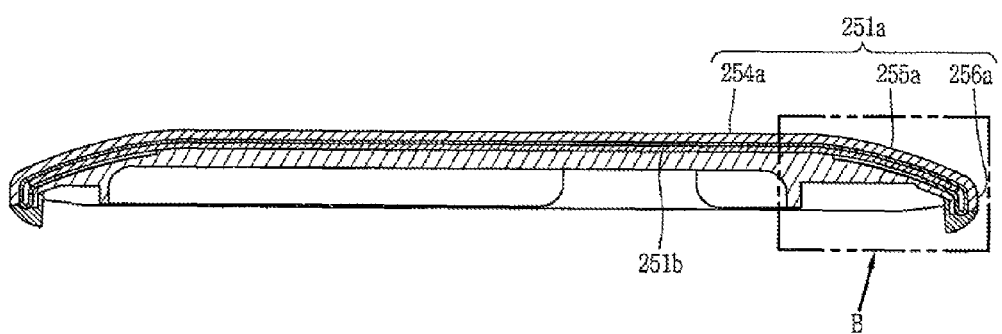

The side input unit may be implemented with a new type of structure. Hereinafter, a configuration of the side input unit will be explained in more detail. FIG. 4 is a sectional view taken along line "A-A" in FIG. 3a, FIG. 5 is an enlarged view of part 'B' in FIG. 4, and FIG. 6 is an exploded view of the mobile terminal of FIG. 3a.

Figure 5:
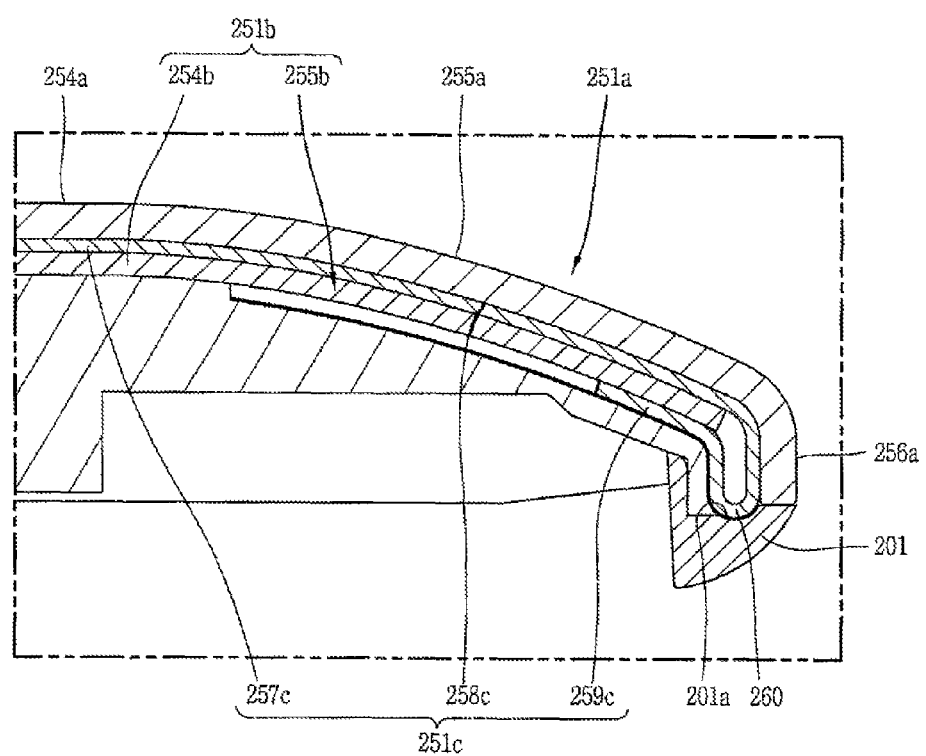
FIG. 5 is an enlarged view of part 'B' in FIG. 4.
Figure 6:
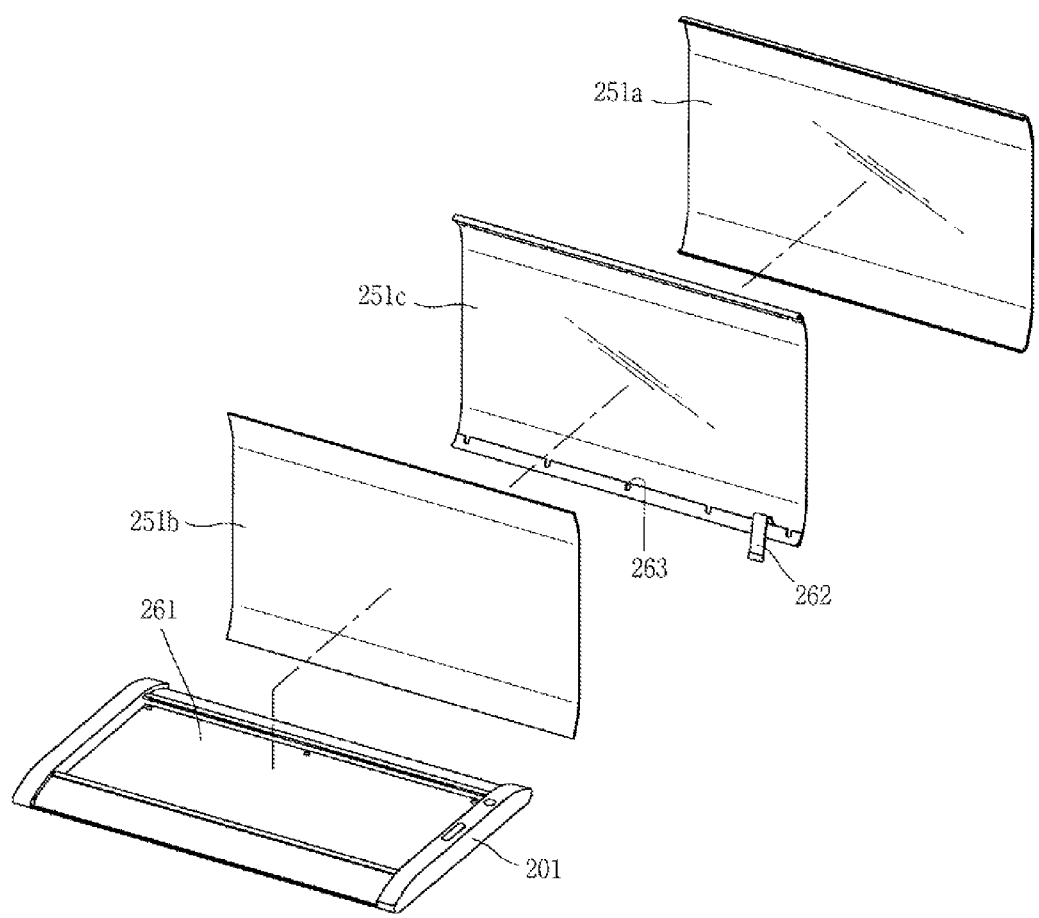

Referring to FIGS. 4 to 6, a window 251a is coupled to one surface of the front case 201. The window 251a may be formed of transmissive material, e.g., transmissive synthetic resin, reinforcing glass, etc. However, the window 251a may include a non-transmissive region.

The body is provided with a front surface, a rear surface and side surfaces. And the window 251a is arranged on the front surface, and the window 251a has its edge portion bent so as to form at least part of the side surfaces.

More specifically, the window 251a includes a front portion 254a and an inclined portion 255a. The front portion 254a may be part which forms at least part of the front surface of the mobile terminal. And the inclined portion 255a may be part which extends from the edge portion of the front portion 254a in a direction inclined from the front portion 254a. The window 251a may include a vertical side portion 256a which extends from the inclined portion 255a in a thickness direction of the body.

For instance, the inclined portion 255a and the vertical side portion 256a may be implemented so that prescribed sections thereof can be extended in a lengthwise direction of the mobile terminal. The front portion 254a, the inclined portion 255a and the vertical side portion 256 may be sequentially formed in a width direction of the mobile terminal.

As shown, the inclined portion 255a and the vertical side portion 256a are provided with no push keys. That is, the side surfaces of the mobile terminal are provided with no push keys. Under such configuration, the mobile terminal can have a very thin thickness, and the display module 251 formed on the front surface of the mobile terminal can have a larger screen.

More specifically, the inclined portion 255a may be a curved surface having an inclination angle with respect to the front portion 254a. The inclination angle of the inclined portion 255a may be variable in a widthwise direction of the mobile terminal. Accordingly, the inclined portion 255a has a specific radius of curvature.

The vertical side portion 256a is formed at the edge portion (or the end) of the inclined portion 255a in a direction perpendicular to the front portion 254a. Under such configuration, a boundary between the inclined portion 255a and the vertical side portion 256a is bent. However, the present invention is not limited to this. For instance, the vertical side portion 256a may have a different inclination angle from the inclined portion, or may be bent from the boundary between the inclined portion 255a and the vertical side portion 256a, In this case, the side portion is not extended in a direction perpendicular to the front portion 254a.

The aforementioned window is implemented as a single window. Accordingly, the front portion 254a, the inclined portion 255a and the vertical side portion 256a may be integrally formed with each other. Further, the integrated single window is supported by the front case 201. To this end, a supporting surface for supporting the window 251a is provided at the front case 201. The front case 201 may be formed not to be exposed to outside from the side surfaces of the mobile terminal. In this case, the side appearance of the mobile terminal is formed by the window 251a and the rear case 202 (refer to FIG. 3b).

As shown, a display 251b may be mounted to a rear surface of the window 251a. The display 251b is configured to display visual information, and is arranged to be covered by the window 251a. The display 251b may include at least one of a Liquid Crystal Display (LCD), a Thin Film Transistor-LCD (TFT-LCD), an Organic Light Emitting Diode (OLED) display and a three-dimensional (3D) display.

The window 251a may be arranged to cover the display 251b, and a transmissive region of the window 251a may have an area corresponding to the display 251b. Under such configuration, a user can recognize visual information output to the display 251b from outside. Further, the display 251b has a bent appearance like a flexible display. More specifically, the display 251b is formed so that its edge portion can be bent in correspondence to a bent shape of the window 251a.

For instance, the display 251b includes a front display portion 254b and an inclined display portion 255b. The front display portion 254b has a size and a shape corresponding to those of the front portion 254a of the window 251a, and the inclined display portion 255b has a size and a shape corresponding to those of the inclined portion 254b of the window 251a, The inclined display portion 255b may have a length shorter than that of the inclined portion 254b of the window 251a. Under such configuration, the end of the inclined portion 254b of the window 251a and the end of the inclined display portion 255b may not be formed on positions facing each other.

As shown, a touch sensor 251c, configured to sense a touch input applied to the window 251a, is disposed between the window 251a and the display 251b.

For instance, the touch sensor 251c may be mounted to the rear surface of the window 251a, and a transmissive region of the window 251a forms an inputtable region through the touch sensor 51e. The touch sensor 251c is formed to be transmissive. In order to sense a touch input, the touch sensor 251c is configured to convert changes of a voltage, a capacitance, etc. occurring from a specific part of the window 251a into an electric input signal. More specifically, the touch sensor 251c may be configured to convert changes of a pressure applied to a prescribed part of the display module 251, or a capacitance occurring from a prescribed part of the display module 251, into electric input signals. Also, the touch sensor may be configured to sense not only a touched position and a touched area, but also a touch pressure.

The window 251a, the touch sensor 251c and the display 251b may be configured as the display module 251. In this case, the display module 251 operates as a touch screen.

As shown, the touch sensor 251c is configured to cover a rear surface of the display 251b as at least part thereof is folded. For instance, the touch sensor 251c is formed to cover the rear surface of the display 251b with at least part thereof enclosing the end of the display 251b.

More specifically, the touch sensor 25k includes a first part 257c, a second part 258c and a third part 259c.

The first part 257c, which corresponds to the front portion 254a of the window 251a, is formed as a plane. And the first part 257c is configured to sense a touch input applied to the front surface of the mobile terminal. To this end, the first part 257c may include transmissive insulating layers where patterned conductive lines are arranged. For instance, a plurality of conductive lines are formed at the first part 257c in horizontal and vertical directions, so as to calculate a touched position on the window 251a.

The second part 258c, which corresponds to the inclined portion 255a of the window 251a partially or wholly, may be part which extends from the edge portion of the first part 2570 in a direction inclined from the first part 257c. That is, the second part 258c is extended from the plane, and is formed so that at least part thereof can be inclined.

For instance, the second part 258c of the touch sensor 251c may be bent from at least one point so as to cover both of the inclined portion 255a and the vertical side portion 256a.

The transmissive insulating layers are extended up to the second part 258c so that a touched position on the second part 258c can be calculated. A plurality of conductive lines, connected to the conductive lines of the first part 257c, are formed at extended part.

The third part 259c, folded partially or wholly so as to be overlapped with the second part 258c, may be part extending from the edge portion of the second part 258c. The touch sensor 251e may include a curved portion 260 curved by the folding between the second part 258c and the third part 259c. The curved portion 260 is spaced from the end of the display 251b in a thickness direction of the body. That is, the display 251b is provided with a side end part spaced from a side end part of the window 251a. Under such configuration, the edge portion of the display 251b may be disposed between the second part 258c and the third part 259c, and a space may be formed between the end of the display 251b and the curved portion 260. The third part 259c of the touch sensor 251c is formed to have a shape corresponding to that of the second part 258c, so as to maintain a gap from the second part 258c. Under such configuration, the space is formed.

The structure is a mechanism where the first part 257c, the second part 258c and the third part 259c are integrally formed with each other. Here, the first part 257c and the second part 258c form a touch screen together with the display 251b, and the third part 259c allows a side touch of the mobile terminal without being combined with the display 251b. Under such mechanism, a side touch sensing device, where thickness increase of a bezel portion is small, may be implemented in the mobile terminal.

As the touch sensor 251c is folded at the curved portion 260, the end of the third part 259c covers the rear surface of the display 251b. For instance, the third part 259c may be bonded to the rear surface of the display 251b with covering the rear surface of the display 251b. Under such configuration, the window 251a, the touch sensor 251c and the display 251b may be modularized, and the mobile terminal may implement a side touch.

An accommodation groove 201a, configured to accommodate therein at least part of the curved portion, may be formed at the supporting surface of the front case 201. As the curved portion 260 is disposed at the accommodation groove 201a, the curved portion 260 of the touch sensor 251c may protrude from the window 251a. Under such configuration, a mechanism, where touch sensing can be extended up to the side ends of the window 251a, can be implemented.

The transmissive insulating layers of the second part 258c are extended to form a base of the third part 259e, and conductive lines for signal transmission are formed at the base. More specifically, touch sensing patterns may be formed at the first part 257c and the second part 258c. And signal transmission patterns, connected to the touch sensing patterns and configured to transmit touch signals to a circuit board 261, may be formed at the third part 259c.

The signal transmission patterns, data lines for transmitting signals to the circuit board 261, may be arranged along the edge portion of the transmissive insulating layers. And the signal transmission patterns may be connected to a flexible printed circuit board (FPCB) 262. That is, the FPCB 262 connected to the circuit board 261 is mounted to the third part 259c. However, the present invention is not limited to this. The FPCB 262 may be connected to the upper end of the touch sensor, rather than the right side or the left side of the touch sensor.

The circuit board 261 may be configured as an example of the controller 180 (refer to FIG. 1) for performing various types of functions of the mobile terminal. Various types of electronic devices, etc. may be mounted to the circuit board 261.

The third part 259c is overlapped with the second part 258c, and the signal transmission patterns are formed at the third part 259c. Accordingly, increase of the size of the mobile terminal for signal transmission means increase of the thickness of the mobile terminal due to the third part 259c. Under such configuration, a region on the touch sensor for trace signals may be increased.

As shown, the third part 259c may be provided with a plurality of cut-out portions 263. Through the cut-out portions 263, a bonding region on the rear surface of the display 251b, to which the third part 259c is bonded, may be increased while interference between the third part 259c and other component is minimized.

If the bar-type mobile terminal is merely folded for a side touch, the thickness of the mobile terminal is increased due to a side touch sensing structure and a bezel portion. In the present invention, a prescribed part of the touch sensor (e.g., part corresponding to a bezel portion is folded for prevention of thickness increase of the mobile terminal.

Such structure may be modified in various manners, which will be explained in more detail.

Figure 7:
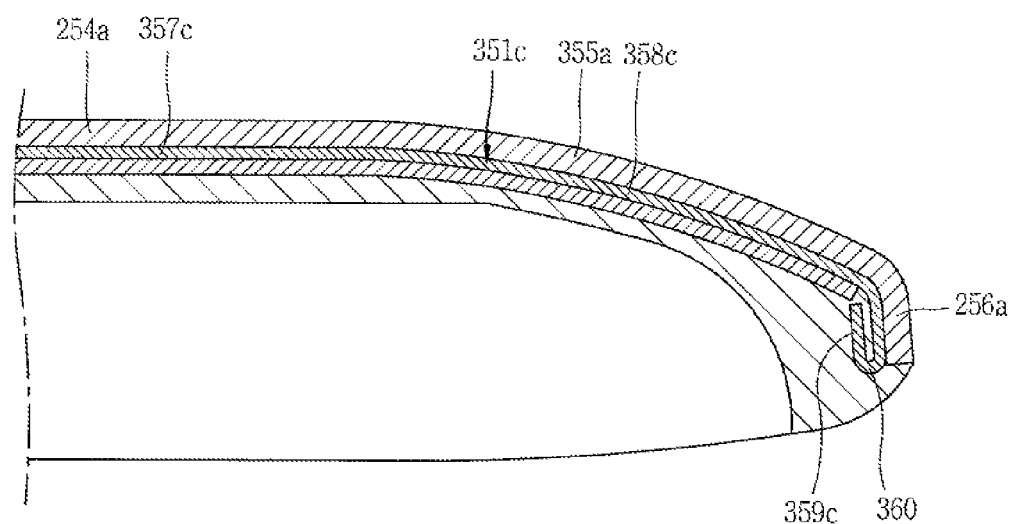
FIG. 7 is a sectional view of a mobile terminal according to another embodiment of the present invention.

In the following modification embodiments or preferred embodiments, components having the same or similar configuration as/to those of the aforementioned embodiment will be provided with the same or similar reference numerals, and explanations thereof will be omitted. FIG. 7 is a sectional view of a mobile terminal according to another embodiment of the present invention.

As shown, a window 251a and a display 251b have the same configuration as those of the aforementioned embodiment, but a touch sensor 351c has a modified configuration.

For instance, the touch sensor 351c is formed to be overlapped with its part as at least part thereof is folded, but not to cover the rear surface of the display 251b. More specifically, the touch sensor 351c includes a first part 357c, a second part 358c and a third part 359c.

The first part 357c, which corresponds to the front portion 254a of the window 251a, is formed as a plane. And the first part 357c is configured to sense a touch input applied to the front surface of the mobile terminal.

The second part 358e, which corresponds to the inclined portion 255a of the window 251a partially or wholly, may be part which extends from the edge portion of the first part 357c in a direction inclined from the first part 357c. That is, the second part 358c is extended from the plane, and is formed so that at least part thereof can be inclined.

The third part 359c, folded partially or wholly so as to be overlapped with the second part 358c, may be part extending from the edge portion of the second part 358c. However, the third part 359c is extended from the second part up to a point which does not cover the rear surface of the display 251b. The touch sensor 351c may include a curved portion 360 curved by the folding between the second part 358c and the third part 359c. The curved portion 360 is spaced from the end of the display 251b in a thickness direction of the body.

Under such configuration, the edge portion of the display 251b may not be disposed between the second part 358c and the third part 359c, and a space may be formed between the end of the display 251b and the curved portion 360.

If a side touch is applied to the mobile terminal having such structure, interference may occur between a bezel portion and a touch sensing region when a touch input is sensed and a signal is transmitted. To prevent such problem, a shielding member such as a metallic member may be inserted into a space formed between the end of the display 251b and the curved portion 360. However, the metallic member is not limited to this embodiment, but may be applied to the aforementioned embodiment. That is, the metallic member may be also applied to a space between the end of the display and the curved portion in the aforementioned embodiment.

Figure 8:
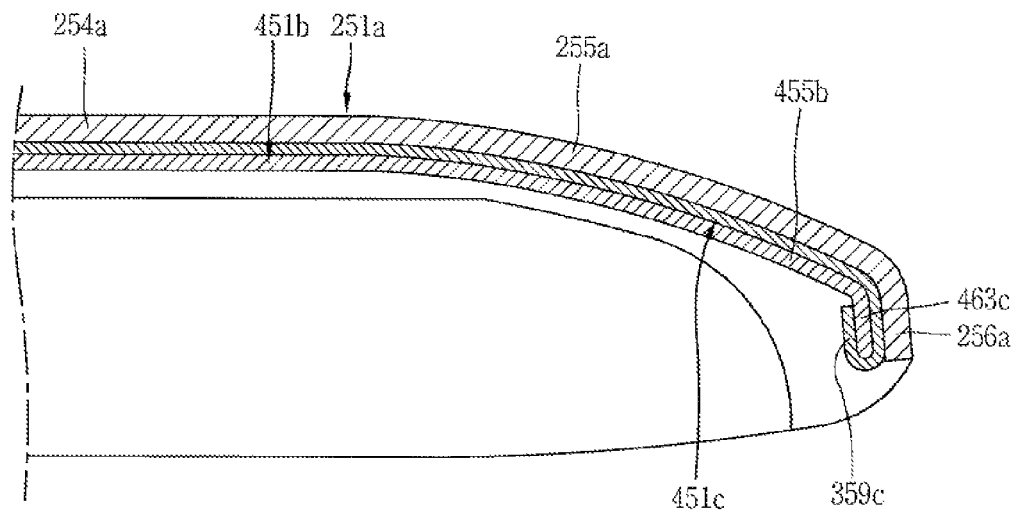
FIG. 8 is a sectional view of a mobile terminal according to another embodiment of the present invention.

FIG. 8 is a sectional view of a mobile terminal according to another embodiment of the present invention.

As shown, a window 251a has the same configuration as that of the aforementioned embodiment, but a display 451b and a touch sensor 451c have a modified configuration.

The display 451b is implemented as an organic light-emitting diode (OLED), and is provided with a side display portion 463c corresponding to the vertical side portion 256a of the window 251a. Under such configuration, the display 451b is extended up to part where the touch sensor 451c is folded (curved).

The side display portion 463c is formed at the edge portion (or the end) of an inclined display portion 455b in a direction perpendicular to the front display portion 254b. Under such configuration, a boundary between the inclined portion 455b and the side display portion 463c is bent. However, the present invention is not limited to this. For instance, the side display portion 463c may have a different inclination angle from the inclined display portion 455b, or may be bent from the boundary between the inclined portion 455b and the side display portion 463c. In this case, the side display portion is not extended in a direction perpendicular to the front display portion 254b.

As shown, the touch sensor 451c is configured to cover a rear surface of the side display portion 463c as the third part 359c thereof is folded.

The display 451b is extended up to a folded part (curved portion) of the touch sensor 451c, and the third part 359c covers the side display portion. Under such configuration, interference occurring between a bezel portion and a touch sensing region can be prevented.

Figure 9:
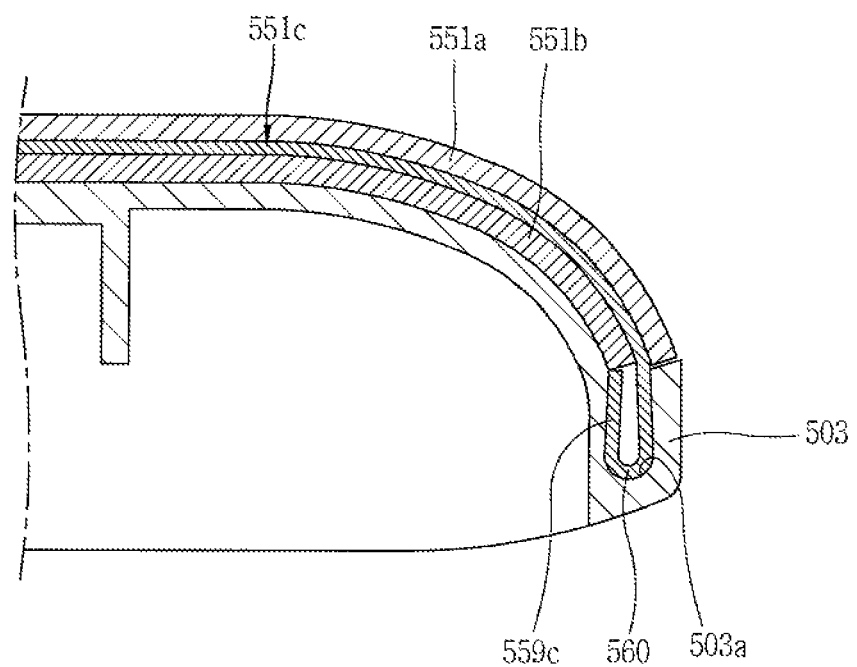
FIG. 9 is a sectional view of a mobile terminal according to another embodiment of the present invention.
Figure 10:
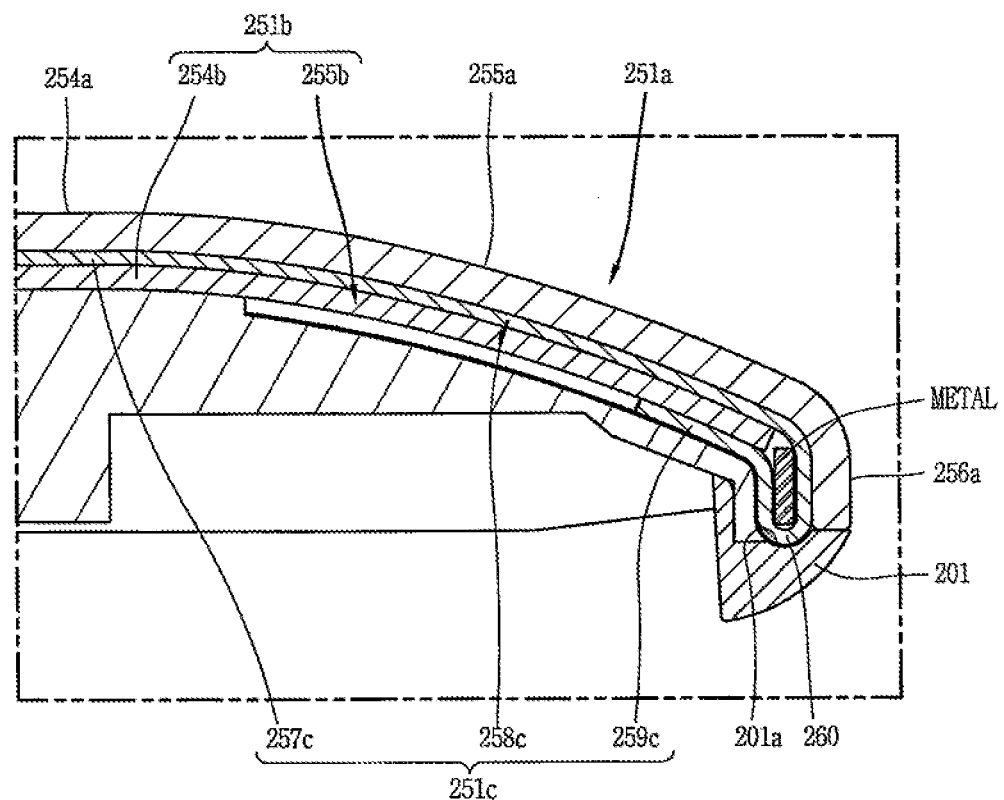
FIG. 10 is an enlarged view of part "B" in FIG. 4 with a metallic member according to an embodiment of the present invention.

FIG. 9 is an exploded view of a mobile terminal according to another embodiment of the present invention.

As shown, a body comprises a frame 503 which supports a window 551a. The frame 503 is configured to support a rear surface of a display 551b, and to implement the side appearance of the mobile terminal partially or wholly.

An accommodation groove 503a, configured to accommodate therein at least part of a curved portion 560 of a touch Sensor 551c, is formed at the frame 503. More specifically, a third part 559c of the touch sensor 551c is completely accommodated in the accommodation groove 503a, without covering the rear surface of the display 551b. In this case, the window 551a, the display 551b, the touch sensor 551c and the frame 503 may be implemented as a single module.

The present invention can have the following advantages.

Firstly, at least part of the touch sensor is folded to cover the rear surface of the display. Under such configuration, a side touch sensing device, where thickness increase of a bezel portion is small, can be implemented.

Secondly, as the rear surface of the display is covered, a region on the touch sensor for trace signals can be increased. Under such configuration, a side touch sensing device, where a signal sensing region is extended up to the end of the side surfaces of the mobile terminal, can be implemented.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a body having a front surface, a rear surface and side surfaces;
   a window disposed on the front surface, and having at least one edge portion bent so as to form at least part of the side surfaces;
   a case having a supporting surface supporting the window;

a display disposed to face the window, and configured to output visual information and formed such that its edge portion is bent in correspondence to a bent shape of the window; and a touch sensor disposed between the window and the display, configured to sense a touch input applied to the window, wherein the touch sensor is mounted to a rear surface of the window, wherein the supporting surface of the case supports the at least one edge portion of the window, and wherein an accommodation groove is recessed from the case in a thickness direction of the body, is formed at the supporting surface of the case and is configured to accommodate therein at least one curved portion of the touch sensor.

2. The mobile terminal of claim 1, wherein the touch sensor includes a folded part, wherein the at least one curved portion of the touch sensor is curved by the folded part of the touch sensor, and herein the at least one curved portion is spaced from an end part of the display in a thickness direction of the body so as to form a space between the end part of the display and the at least one curved portion.

3. The mobile terminal of claim 2, wherein at least a part of the folded part of the touch sensor covers a rear surface of the display.

4. The mobile terminal of claim 1, wherein an audio output module is disposed at the case.

5. The mobile terminal of claim 1, wherein the touch sensor is mounted to a rear surface of the window.

6. The mobile terminal of claim 5, wherein the window comprises:

a front portion which forms at least part of the front surface; and an inclined portion which extends from an edge portion of the front portion in a direction inclined from the front portion; and the touch sensor comprises:

a first part corresponding to the front portion of the window;

a second part corresponding to the inclined portion of the window partially or wholly; and a third part folded partially or wholly so as to be overlapped with the second part.

7. The mobile terminal of claim 6, wherein a flexible printed circuit board, connected to a circuit board, is mounted to the third part of the touch sensor.

8. The mobile terminal of claim 6, wherein a plurality of cut-out portions are formed at the third part of the touch sensor.

9. The mobile terminal of claim 1, wherein two side surface of the window are configured to be bent.

* * * * *